(12) United States Patent
Kröner et al.

(10) Patent No.: US 7,890,104 B2
(45) Date of Patent: Feb. 15, 2011

(54) MANAGEMENT METHOD FOR RADIO RESOURCES IN A RADIO TELECOMMUNICATION SYSTEM

(75) Inventors: Hans Kröner, Geislingen-Weiler (DE); Jürgen Mayer, Blaustein (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/504,208

(22) PCT Filed: Feb. 7, 2003

(86) PCT No.: PCT/DE03/00355

§ 371 (c)(1),
(2), (4) Date: Sep. 1, 2004

(87) PCT Pub. No.: WO03/069938

PCT Pub. Date: Aug. 21, 2003

(65) Prior Publication Data

US 2005/0090257 A1  Apr. 28, 2005

(30) Foreign Application Priority Data

Feb. 11, 2002 (DE) ............... 102 05 575
Apr. 4, 1920 (DE) ............... 102 14 934

(51) Int. Cl.
H04W 36/00 (2009.01)
(52) U.S. Cl. .............. 455/436; 455/453; 455/438; 455/437
(58) Field of Classification Search ...... 455/432.1–433, 455/435.3, 453, 552.1–553.1, 426.1, 436–444, 455/432, 455, 435.2, 428
See application file for complete search history.

(56) References Cited

U.S. PATENT DOCUMENTS 5,396,647 A * 3/1995 Thompson et al. .......... 455/440

(Continued)

FOREIGN PATENT DOCUMENTS

JP  3874723 B2  1/2007

(Continued)

OTHER PUBLICATIONS

Proposed Technical Report: "3G TR 25.881 V0.4.0", $3^{rd}$ Generation Partnership Project; Technical Specification Group Radio Access Network; Improvement of RRM across RNS and RNS/BSS (Rel 5), Nov. 2001, pp. 1-30.

(Continued)

*Primary Examiner*—Charles N Appiah
*Assistant Examiner*—Kwasi Karikari
(74) *Attorney, Agent, or Firm*—Laurence A. Greenberg; Werner H. Stemer; Ralph E. Locher

(57) ABSTRACT

The invention relates to a management method for radio resources in a radio telecommunication system, in which a first radio telecommunication system has a first decentralized functional unit (serving RRM function) for managing radio resources, and a second radio telecommunication system has a second decentralized functional unit (neighbouring RRM function) for managing radio resources. The first and the second decentralized function unit signal information with respect to a work load (load measurements) of the radio resources to a central functional unit for common radio resource management (CRRM function). The central functional unit (CRRM function) evaluates this information (load measurements) and signals information with respect to load targets to at least one of the decentralized functional units, said information being taken into consideration by the decentralized functional unit in an intersystem handover (ISHO).

12 Claims, 1 Drawing Sheet

U.S. PATENT DOCUMENTS

| | | | | |
|---|---|---|---|---|
| 5,913,167 | A * | 6/1999 | Bonta et al. | 455/436 |
| 5,933,777 | A * | 8/1999 | Rahman | 455/450 |
| 6,115,608 | A * | 9/2000 | Duran et al. | 455/436 |
| 6,198,937 | B1 * | 3/2001 | DeClerck et al. | 455/517 |
| 6,339,705 | B1 * | 1/2002 | Pehrson | 455/419 |
| 6,430,414 | B1 * | 8/2002 | Sorokine et al. | 455/442 |
| 6,738,625 | B1 * | 5/2004 | Oom et al. | 455/453 |
| 6,771,964 | B1 * | 8/2004 | Einola et al. | 455/437 |
| 6,845,238 | B1 * | 1/2005 | Muller | 455/436 |
| 6,895,245 | B2 * | 5/2005 | Wallentin | 455/436 |
| 6,968,192 | B2 * | 11/2005 | Longoni | 455/453 |
| 7,336,631 | B2 * | 2/2008 | Okubo | 370/329 |
| 2001/0016482 | A1 * | 8/2001 | Bergstrom et al. | 455/332 |
| 2001/0053695 | A1 * | 12/2001 | Wallentin | 455/436 |
| 2002/0072363 | A1 * | 6/2002 | Riihinen et al. | 455/432 |
| 2002/0102978 | A1 * | 8/2002 | Yahagi | 455/453 |
| 2002/0132622 | A1 * | 9/2002 | Bender et al. | 455/442 |
| 2002/0187784 | A1 * | 12/2002 | Tigerstedt et al. | 455/439 |
| 2005/0277416 | A1 * | 12/2005 | Tolli et al. | 455/436 |

FOREIGN PATENT DOCUMENTS

| | | |
|---|---|---|
| WO | 02/32179 A1 | 4/2002 |

OTHER PUBLICATIONS

Technical Report: "3GPP TR 25.891 V0.1.1", $3^{rd}$ Generation Partnership Project; Technical Specification Group Radio Access Network; Improvement of RRM across RNS and RNS/BSS (Post Rel-5); (Release 6), Oct. 2002, pp. 1-17.

Technical Report: 3GPP TR 25.881 V2.0.0, $3^{rd}$ Generation Partnership Project; Technical Specification Group Radio Access Network; Improvement of RRM across RNS and RNS/BSS (Rel. 5), Dec. 2001.

* cited by examiner

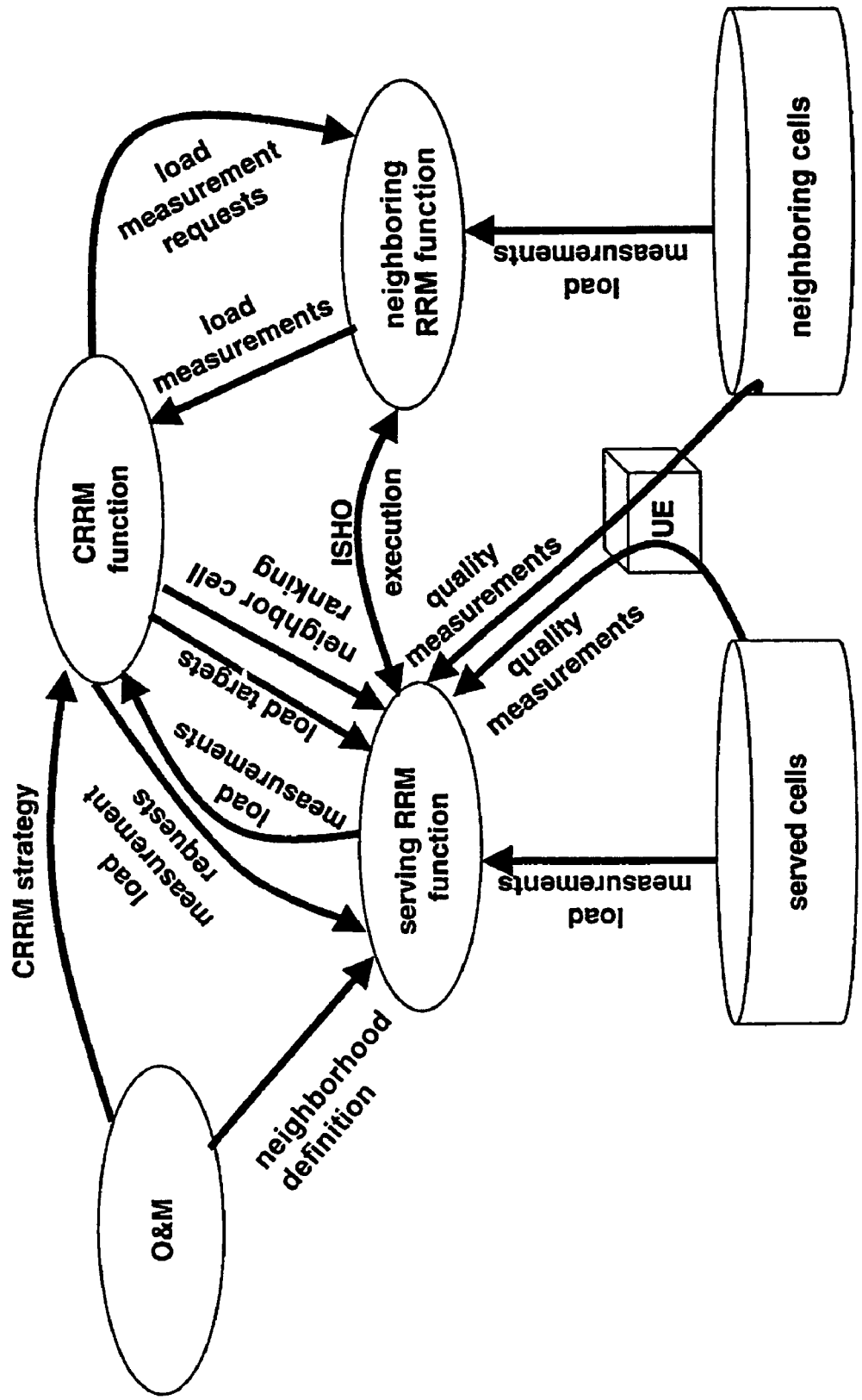

MANAGEMENT METHOD FOR RADIO RESOURCES IN A RADIO TELECOMMUNICATION SYSTEM

BACKGROUND OF THE INVENTION

Field of the Invention

The invention relates to a method for managing radio resources in a radio communication system, especially to control an intersystem handover.

In radio communication systems, for example the European mobile radio system of the second generation GSM (Global System for Mobile Communications), information (for example speech, picture information or other data) is transmitted with the aid of electromagnetic waves over a radio interface. The radio interface relates to a connection between a base station and user equipment, where the user equipment can be mobile stations or fixed-location radio stations. The electromagnetic waves in such systems are emitted using carrier frequencies which lie within the frequency range provided for the relevant system. For future mobile radio systems, for example UMTS (Universal Mobile Telecommunication System) or other 3rd-generation systems, carrier frequencies in the range of around 2000 MHz are provided. For third-generation mobile radio there is provision for two modes, where one mode designates FDD (Frequency Division Duplex) and the other mode TDD (Time Division Duplex). These modes are each used in different frequency bands. Both modes support what is known as the CDMA (Code Division Multiple Access) user separation procedure.

These different radio communication systems will in future exist in parallel in the same geographical region. Each of these systems features its own management for the radio resources available. This is also known as Radio Resources Management (RRM). In the known systems such as GSM and UMTS this functionality is implemented in the Base Station Controller (BSC) or in the Radio Network Controller (RNC). Parts of this functionality can also be realized in the User Equipment (UE). Future user equipment will allow access to a number of radio communication systems, this equipment will be referred to as multimode equipment. What is known as an Inter System Handover (ISHO) will be implemented between the various radio communication systems, which will allow user equipment to continue or maintain a connection established in one system in another system.

There is not currently any coordination between the RRM functionalities of the different systems in the sense of Common Resource Management (CRRM). An inter System Handover is therefore undertaken "blind", i.e. without knowledge of the current load situation of the target system or the target radio cell. It Is therefore not possible to distribute or administer the load between the systems.

Within the framework of 3GPP (3rd Generation Partnership Program) of the UMTS system, different approaches to solving this problem are being discussed. Two approaches to solutions for this problem are known from the document 3GPP 3G TR 25.881, V0.4.0 (2001-11) "Improvement of RRM across RNS and RNS/BSS (Rel 5)". A first proposal provides for a physical CRRM server which controls the entire procedure of the Inter System Handover. The disadvantage of this proposal is that, because of this central server the process for handing over is additionally delayed, and the exchange of information between the central CRRM server and the local RRM node also becomes very time-critical. A second proposal makes provision for an interface at each of RRM node for exchange of measurements of the radio cell load with other RRM neighboring systems. The decision about an Inter System handover is made solely by the relevant RRM node. The disadvantage of this proposal is that there is no uniform CRRM strategy since RRM nodes of different vendors or system operators can implement different CRRM strategies which may not be compatible with each other.

SUMMARY OF THE INVENTION

The object of the invention is thus to specify a method which overcomes the disadvantages of the described solutions. This object is achieved by the features of the independent claims. Advantageous developments of the invention can be taken from the dependent patent claims.

In accordance with a first aspect of the invention a central functional unit for common management of the radio resources, especially in the sense of a CRRM, is implemented, which communicates with the local functional units involved, for example RRM nodes. The central functional unit receives from the local functional units information and for example measurements, relating to a load, for example relating to radio cell load, and controls the Inter System handover by definition of a methodology for Inter System handover which is signaled to the local functional units. The local functional units are responsible for executing the Inter System handover in accordance with the specified methodology. This means that the central functional unit is not directly involved in the decision on an Inter System handover, meaning that advantageously no real-time requirements have to be fulfilled. Furthermore a CRRM global strategy which is independent of vendors or operators can be followed.

In accordance with the second aspect of the invention the information of the local functional units is evaluated in the central functional unit and a ranking of potential targets for controlling the Inter System handover is determined. This specific ranking is subsequently made available to at least one of the local functional units.

An advantageous development results in the local functional units being split into functional subunits. In this case mobile functional subunits, for example mobile stations of users make a decision about a time and/or a target of an Inter System handover. Furthermore network-linked functional subunits communicating directly with the central functional unit define on the basis of information received from the central functional unit rules and/or parameters for the Inter System handover. The network-linked functional subunits then signal the rules and/or parameters to the mobile functional subunits are which in their turn take account of these rules and/or parameters during Inter System handover.

The invention is described in more detail below on the basis of an exemplary embodiment which refers to the sole FIGURE of the drawing.

The FIGURE shows the functional interfaces for implementing the common management of radio resources.

DESCRIPTION OF THE PREFERRED EMBODIMENTS:

The FIGURE shows the interfaces and the flow of signaling between the units of one or more systems. The procedural steps described below for an Inter System handover can be applied in the same way to an Intra System handover.

User equipment UE is supplied with radio resources via served cells. The management of the radio resources in the served cells is undertaken in a first local functional unit (serving RRM function). In addition to measurement of the transmission quality (quality measurements) the first local functional unit also obtains from the user equipment for at least one of the served cells measurements of the transmission quality to at least one of the neighboring cells of a parallel radio communication system which is taken into account for execution of an Inter System handover (ISHO execution). The neighboring radio cells or the neighboring radio communication system which is taken into account (neighborhood definition) is signaled to the first local functional unit if necessary by what is referred to as an Operation and Maintenance (O&M) center. This operation and maintenance center can a furthermore specify the system-specific or global strategy of the central radio resource management (CRRM strategy) of the central functional unit for common radio resource management (CRRM function). As well as the measurement of transmission quality, the first local functional unit receives messages about a relevant load (load measurements) of the served radio cells connected to it. These measurements are signaled by the first local functional unit after a request (load measurement request) to the central functional unit. The same occurs in the second a local unit (neighboring RRM function). After evaluation of the information, the central functional unit determines a load target and/or a ranking of the neighboring cells (neighbor cell ranking) and signals this to the first local functional unit. Taking into account this information or the methodology defined by it, the first local functional unit subsequently controls the execution of the Inter System handover (ISHO execution).

The CRRM methodology is specified to the local functional units both by a definition of the load target of the radio cells under its responsibility and by the definition of a ranking of the neighboring radio cells. The local functional unit can select a suitable radio cell or a suitable system for an Inter System handover according to these specifications. Alternatively to the structure shown in the figure, there can, according to the invention, be a number of central functional units which exchange rankings and/or load messages with each other.

The functional units can be implemented in a different ways in a radio communication system.

The central functional unit is implemented in one or more CRRM servers. The local functional units are exclusively implemented in the known radio network nodes, for example the RNC or BSC, which are involved in the Inter System handover.

The central functional unit is implemented in one or more CRRM servers. The local functional units are implemented in the known radio network nodes, for example the RNC or BSC, and in the user equipment. The rankings of the neighboring radio cells are transferred, by broadcast messages for example, to the user equipment which is affected by an Inter System handover decision.

The central functional units are implemented in one radio network node, in a number of nodes or in all nodes, for example the RNC or BSC. The methodology, for example in the form of the rankings of the relevant neighboring cells, is exchanged between these radio network nodes. The local functional units are also implemented, if necessarily exclusively, in radio network nodes, for example in the RNC or BSC which are involved in the Inter System handover decision or support this decision.

The central functional units are implemented in one radio network node, in a number of nodes or in all nodes, for example the RNC or BSC. The methodology, for example in the form of the rankings of the relevant neighboring radio cells, is exchanged between these radio network nodes. The local functional units are also implemented, if necessarily exclusively, in radio network nodes, for example in the RNC or BSC which are involved in the Inter System handover decision or support this decision. The rankings of the neighboring radio cells are transferred, for example by broadcast messages, to the user equipment which is affected by an Inter System handover decision or which supports this decision.

In the last two implementation options the user equipment can be informed about the methodology for example by using adapting of the parameters for cell (re)selection and/or the parameters for the reports of the interfrequency and intersystem measurements. This advantageously allows known procedures to be used at the radio interface to lead the user equipment to perform an Inter System handover or an intersystem cell reselection in such a way that the radio cell load reaches a suitable load target.

The implementation of the solution according to the invention is explained again below Independently of the example described in the environment of the prior art described at the start of this document.

The task of common radio resources management (CRRM) is the central management of the load. This can be the management of the load between various radio communications systems but also between different layers or hierarchy levels within one radio communication system. User equipment can be assigned to a system or a layer independently of the service or service combination and/or the speed of the user equipment. The control of the Inter System handover is thus a functionality of common radio resources management. Although the case of an Inter System handover is examined below, the functionalities and mechanisms described can however equally be applied to Intra System handovers, for example between hierarchical levels of a system.

For the decision about an Inter System handover the following information is required or sensible and is taken into account by the common radio resources management or the central functional unit. This is on the one hand the service or the services and where necessary the speed of the user equipment. Furthermore neighboring radio cells must be available to which the connection can be handed over. The actual radio link quality of the served and neighboring radio cells in each case as well as their target connection quality are further parameters which ought to be known. Furthermore the relevant current radio cell load and the corresponding target radio cell load of the served and the neighboring radio cells ought to be known, in which case these can additionally be determined for specific services and if necessary speeds.

The following information is present in the local functional units. The service or services of the user equipment are signaled during connection setup by the core network. Possible targets for Inter System handover, connection quality targets and a maximum radio cell load in each case of the served radio cells will be specified by the operations and maintenance center. The current connection quality for the served and the neighboring radio cells in each case is known through signaled measurements of the user equipment. The current load level of the served radio cells is known through the signaled measurements of the base stations (Node B or BTS) of the radio cells.

Unknown in the local functional units are the current dynamic target load of the served radio cells as well as the current target load of the neighboring radio cells. The absence of the first parameter has the disadvantage of leading to uncertainty if a connection handover is to be undertaken and the absence of the second parameter makes it more difficult to decide in which radio cell the handover is to occur. In the known method described in the introduction the load targets are specified by the O&M which only allows a suboptimal Inter System load distribution whereas the target load and the current load are unknown so that the connection handover must be undertaken without this knowledge.

In accordance with the inventive solution the parameters are merged in the central functional unit and made available to the local functional units. In the load targets can be notified dynamically if required, for example using abstract values (0% . . . 100%), on a system, layer or radio cell service and/or speed-specific basis. Furthermore the difference between the load values and the target values can be notified to the neighboring radio cells by a service and/or speed-specific ranking, for example by the flag "handover is desired, allowed, not desired, forbidden".

The function of common radio resources management or of the central functional unit initially consists of requesting load measurements from the local functional units and a merging of the measurement results. Subsequently it decides on radio cell and where necessary service-specific load targets. It subsequently informs the local functional units about the load targets of the radio cells assigned in each case. Furthermore it defines radio cell and when necessary service-specific ranking values and informs the local functional units about the relevant rankings of the neighboring radio cells.

The function of the local functional unit of consists of executing measurements as requested by the central functional unit. Furthermore it accepts load targets signaled from the central functional unit for the radio cells which it controls as well as the signaled ranking of the neighboring radio cells: Taking this information into account it decides independently about an Inter System handover.

Advantageously the central functional unit only specifies the methodology by specifying a target value and radio cell rankings. These parameters are not real time-dependent and the signaling load on the interfaces between the central and the local functional units is limited. Furthermore only slight reliability requirements are to be imposed on the central functional unit since the local functional units can operate autonomously for example by using in default values or the last parameters signaled by the central unit as their parameters. The implementation can be designed very flexibly. Thus the central functional unit can be implemented both on a central server and also distributed on a number of system components. The interface between the central and the local units can be standardized whereas implementation of the algorithms and decision-making strategies used in the local units can be vendor or operator-specific.

We claim:

1. A management method for radio resources in a radio communication system, wherein a first radio communications system features a first local functional unit for managing radio resources and a second radio communications system features a second local functional unit for managing radio resources, the first and second local functional units being divided into functional subunits, and the method comprises:

with each of the first and second local functional units, signaling information relating to load measurements of the radio resources to a central functional unit for common radio resources management;

evaluating the information with the central functional unit, and signaling information relating to a load target to at least one of the local functional units, and taking the information relating to the load target into account for an Inter System handover by the at least one of the local functional units;

making a decision, with mobile functional subunits, about a time and/or a target of an Inter System handover and defining roles and/or parameters for Inter System handover with network-linked functional subunits communicating directly with the central functional unit on the basis of information received from the central functional unit;

signaling the roles and/or parameters to the mobile functional subunits with the network-linked functional subunits; and taking into account the roles and/or parameters for the Inter System handover with the mobile functional subunits.

2. The method according to claim 1, wherein the first and second radio communication systems support the same or different access technologies.

3. The method according to claim 1, which comprises requesting information relating to the load measurements by the central functional unit.

4. The method according to claim 1, which comprises defining the load target by the central functional unit for specific radio cells, services and/or speeds.

5. The method according to claim 1, wherein the mobile functional subunits are implemented in mobile stations.

6. A neighborhood of radio communication systems comprising a first radio communications system with a first local functional unit for managing radio resources, a second radio communications system with a second local functional unit for managing radio resources, the first and second local functional units being divided into functional subunits, and a central functional unit for common radio resources management, said local and central functional units being configured for executing the method comprising the steps of:

with each of the first and second local functional units, signaling information relating to load measurements of the radio resources to a central functional unit for common radio resources management;

evaluating the information with the central functional unit, and signaling information relating to a load target to at least one of the local functional units, and taking the information relating to the load target into account for an Inter System handover by the local functional unit;

making a decision, with mobile functional subunits, about a time and/or a target of an Inter System handover and defining roles and/or parameters for Inter System handover with network-linked functional subunits communicating directly with the central functional unit on the basis of information received from the central functional unit;

signaling the roles and/or parameters to the mobile functional subunits with the network-linked functional subunits; and taking into account the roles and/or parameters for the Inter System handover with the mobile functional subunits.

7. The neighborhood of radio communication systems according to claim 6, wherein said central functional unit is implemented in a central network node.

8. The neighborhood of radio communication systems according to claim 6, which comprises a plurality of central network nodes communicating with one another and configured to implement said central functional unit.

9. The neighborhood of radio communication systems according to claim 6, wherein said central functional unit is implemented in at least one network node having implemented therein a local functional unit.

10. The neighborhood of radio communication systems according to claim 6, wherein at least parts of said local functional units are implemented in mobile stations, and said central functional unit is configured to signal to the mobile stations information relating to loads of radio resources, load targets and/or rankings, and the mobile stations are configured to be involved in a decision about a time and/or a target of an Inter System handover.

11. A central functional unit for managing radio resources of a first local functional unit and a second local functional unit, the central functional unit comprising:
- a unit configured to receive information relating to load measurements of radio resources from the first local functional unit and from the second local functional unit;
- said unit additionally being configured to evaluate said load measurement information and to signal information relating to a load target to at least one of the first local functional unit and the second local functional unit;
- the first and second the local functional units being divided into functional subunits, including mobile functional subunits and network functional subunits, wherein:
- the mobile functional subunits make a decision about a time and/or a target of an Inter System handover and define roles and/or parameters for Inter System handover with network-linked functional subunits communicating directly with the central functional unit on the basis of information received from the central functional unit;
- the network-linked functional subunits signal the roles and/or parameters to the mobile functional subunits; and
- the mobile functional subunits taking into account the roles and/or parameters for the Inter System handover.

12. A local functional unit for managing radio resources in a radio communication system including a central network unit, the local functional unit being divided into functional subunits, the local functional unit comprising:
- a unit configured to signal information relating to load measurements of the radio resources to the central network unit for radio resources management;
- said unit additionally being configured to receive information relating to a load target from the central network unit, and to consider said information of a load target when making an Inter System handover;
- mobile functional subunits configured to make a decision, about a time and/or a target of an Inter System handover and define roles and/or parameters for Inter System handover with network-linked functional subunits communicating directly with the central functional unit on the basis of information received from the central functional unit;
- network-linked functional subunits configured to signal the roles and/or parameters to the mobile functional subunits; and
- the mobile functional subunits being configured to take into account the roles and/or parameters for the Inter System handover.

* * * * *